United States Patent [19]
Wishart

[11] 4,418,657
[45] Dec. 6, 1983

[54] SPLIT CYCLE INTERNAL COMBUSTION ENGINES

[76] Inventor: John D. Wishart, P.O. Box 171, Blackburn, Victoria, 3130, Australia

[21] Appl. No.: 395,087

[22] PCT Filed: Nov. 6, 1981

[86] PCT No.: PCT/AU81/00159
§ 371 Date: Jun. 11, 1982
§ 102(e) Date: Jun. 11, 1982

[87] PCT Pub. No.: WO82/01741
PCT Pub. Date: May 27, 1982

[30] Foreign Application Priority Data
Nov. 13, 1980 [AU] Australia ............................. PE6471
Apr. 5, 1981 [AU] Australia ............................. PE8689

[51] Int. Cl.³ .......................... F02B 1/08; F02B 33/00; F02B 75/00
[52] U.S. Cl. ...................................... 123/68; 123/39; 123/431
[58] Field of Search ................... 123/431, 432, 68, 39, 123/26

[56] References Cited
U.S. PATENT DOCUMENTS

| 1,163,671 | 12/1915 | Kraus | 123/68 |
| 1,296,686 | 3/1919 | Neff | 123/68 |
| 2,799,258 | 7/1957 | Black | 123/68 X |
| 2,873,574 | 2/1959 | Webb | 123/68 |
| 3,148,668 | 9/1964 | Bianchi | 123/68 X |
| 3,408,811 | 11/1968 | Wishart | 123/68 X |
| 4,230,075 | 10/1980 | Lowther | 123/68 |

FOREIGN PATENT DOCUMENTS

| 204818 | of 0000 | Fed. Rep. of Germany . |
| 2840923 | 4/1979 | Fed. Rep. of Germany ........ 123/39 |
| 21176 | of 0000 | United Kingdom . |

Primary Examiner—Wendell E. Burns
Attorney, Agent, or Firm—Cushman, Darby & Cushman

[57] ABSTRACT

The high pressures in the combustion chambers of split cycle internal combustion engines require higher voltages to be applied to spark plugs than are utilized in conventional Otto cycle engines, with the result that the working life of the spark plugs is shortened. The present invention overcomes this difficulty by directing into the combustion chamber a pilot charge consisting of a spark-ignitable fuel in admixture with compressed air at a pressure below 2000 kPa, followed, after the pilot charge has been ignited, by a main charge of fuel and compressed air at a pressure higher than 2000 kPa.

4 Claims, 6 Drawing Figures

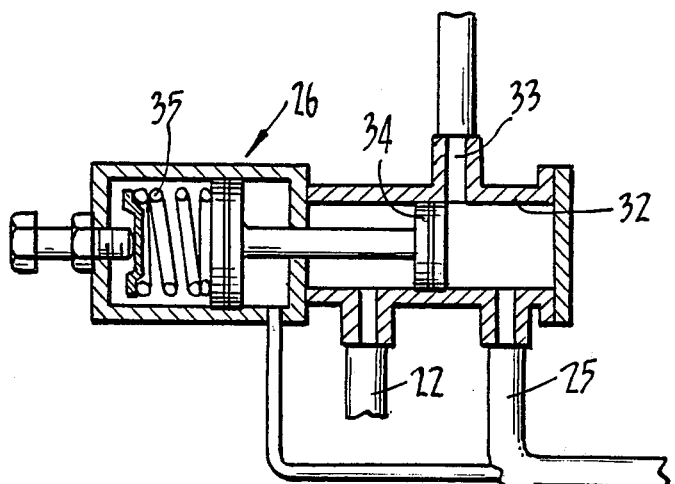
_FIG. 2._
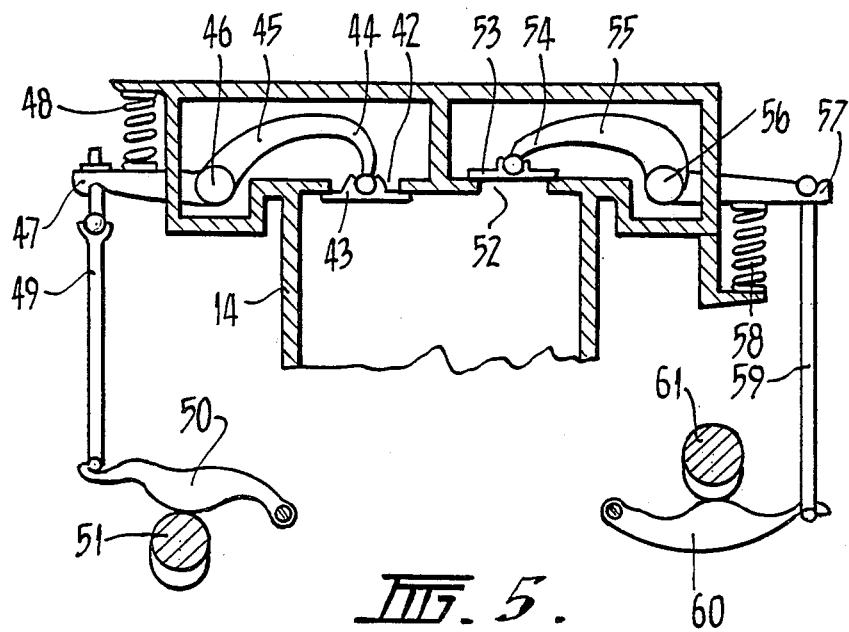
_FIG. 5._

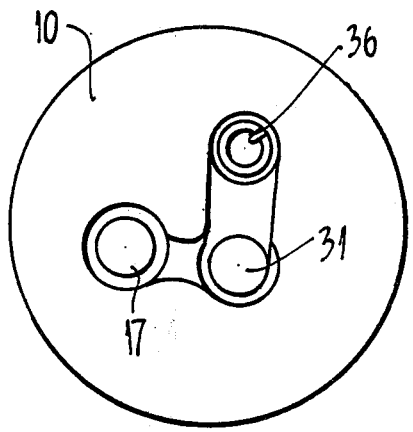
FIG. 3.
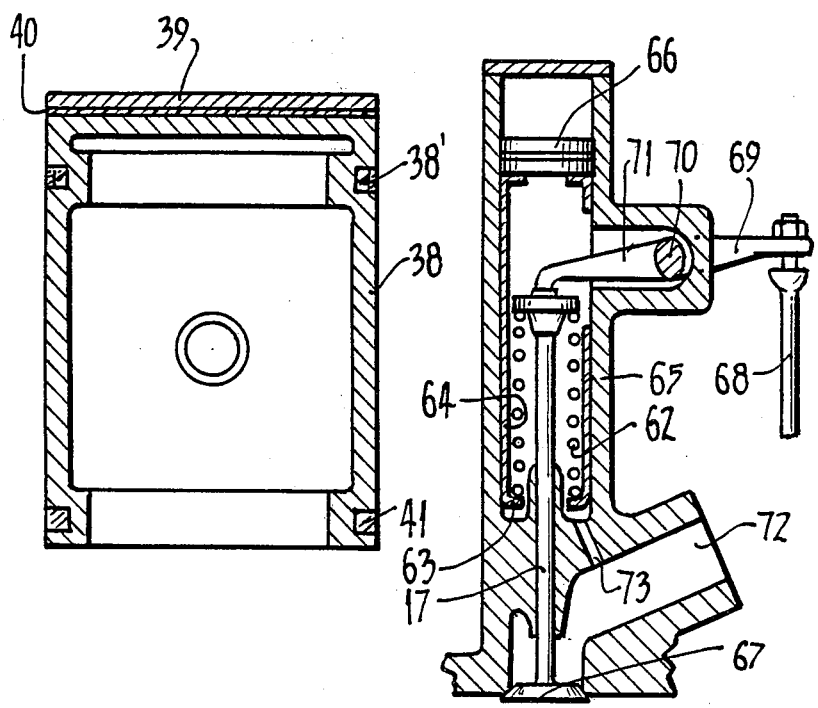
FIG. 4.
FIG. 6.

SPLIT CYCLE INTERNAL COMBUSTION ENGINES

TECHNICAL FIELD

This invention relates to internal combustion engines in which compression is performed in compression cylinders maintained cold and combustion takes place in firing cylinders maintained hot, the compression and firing cylinders being physically separated. Compression pistons and power pistons reciprocate respectively within the compression and firing cylinders, all of the pistons being connected to a common crankshaft. Each firing cylinder has minimal working clearance between the crown of the power piston and the cylinder head, which, together with recesses for the valves and the spark plug, define the combustion chamber. The unswept portion of the combustion chamber is accordingly of very small capacity. The pressures reached within the combustion chambers are greater than those reached in engines operating on the Otto or diesel cycles. The engines of the above described construction are referred to hereinafter as "split cycle engines".

BACKGROUND ART

Split cycle engines have been described in my U.S. Pat. Nos. 3,408,811 and 4,186,561. It has been found in practical experience with engines of the construction described in U.S. Pat. No. 3,408,811 that the high gas pressures in the combustion chamber during ignition require higher electrical potentials to be applied to spark plugs than in conventional internal combustion engines, with the result that the working life of the spark plugs is shortened.

U.S. Pat. No. 4,186,561 was directed to avoiding this difficulty by using ignition means other than spark plugs. Spark plugs, however, permit the timing of ignition in a particularly convenient manner, and equipment for use with them is already available on the market.

DISCLOSURE OF THE INVENTION

It is accordingly the principal object of the present invention to provide a split cycle engine wherein combustion is initiated by conventional spark plugs operating at electrical potentials sufficiently low to ensure a spark plug life comparable with the life of the spark plugs used in conventional Otto cycle spark ignition engines. This requires a gas pressure at the time the spark passes of less than 2000 kPa.

In order to achieve this principal object, the present invention provides a spark ignition internal combustion engine comprising a firing cylinder and a compression cylinder having reciprocating therein respectively a power piston and a compression piston connected to a common crankshaft, a combustion chamber defined by the firing cylinder head, at least one recess containing valve heads and spark plug electrodes, and the crown of the moving power piston, characterised by means directing into the combustion chamber in advance of the spark as the power piston approaches or reaches top dead centre a pilot charge composed of spark-ignitable fuel mixed with compressed air at a pressure below 2000 kPa, means producing a spark across the electrodes at or near top dead centre, and means directing into the combustion chamber after the spark and while the piston is moving away from the cylinder head on the first part of the power stroke a second charge composed of fuel and air compressed to a pressure greater than 2000 kPa.

The unique characteristics of split cycle engines can be exploited to assist deceleration of the engine when by diverting the compressed air supplied by the compression cylinder away from the power cylinder, thereby reducing the pressure in the combustion chamber. The compressed air so diverted may conveniently be stored in a compressed air receiver, which to save weight and space may consist of a honeycomb arrangement of hexagonal tubes joined together side by side to form structural members of a frame of a vehicle or other structure associated with the engine.

The means directing compressed air into the combustion chamber may comprise at least one poppet valve closed by a compression spring bearing against a movable stop urged in the direction to close the valve by the pressure of the compressed air. The force required from the mechanism opening the valve is then less than would be required in the absence of this arrangement.

One practical example of an engine according to the present invention will now be described with reference to the accompanying drawings.

BRIEF DESCRIPTION OF THE DRAWINGS

FIG. 2 is a cross section on a larger scale of a component of the engine;

FIG. 3 is a cross section on line 3—3 of FIG. 1 on a larger scale;

FIG. 4 is a cross section of a power piston;

FIG. 5 is a cross section on a larger scale of the head of the compression cylinder; and FIG. 6 is a cross section on a larger scale of a further component of the engine.

BEST MODE OF CARRYING OUT THE INVENTION

Figure 1:
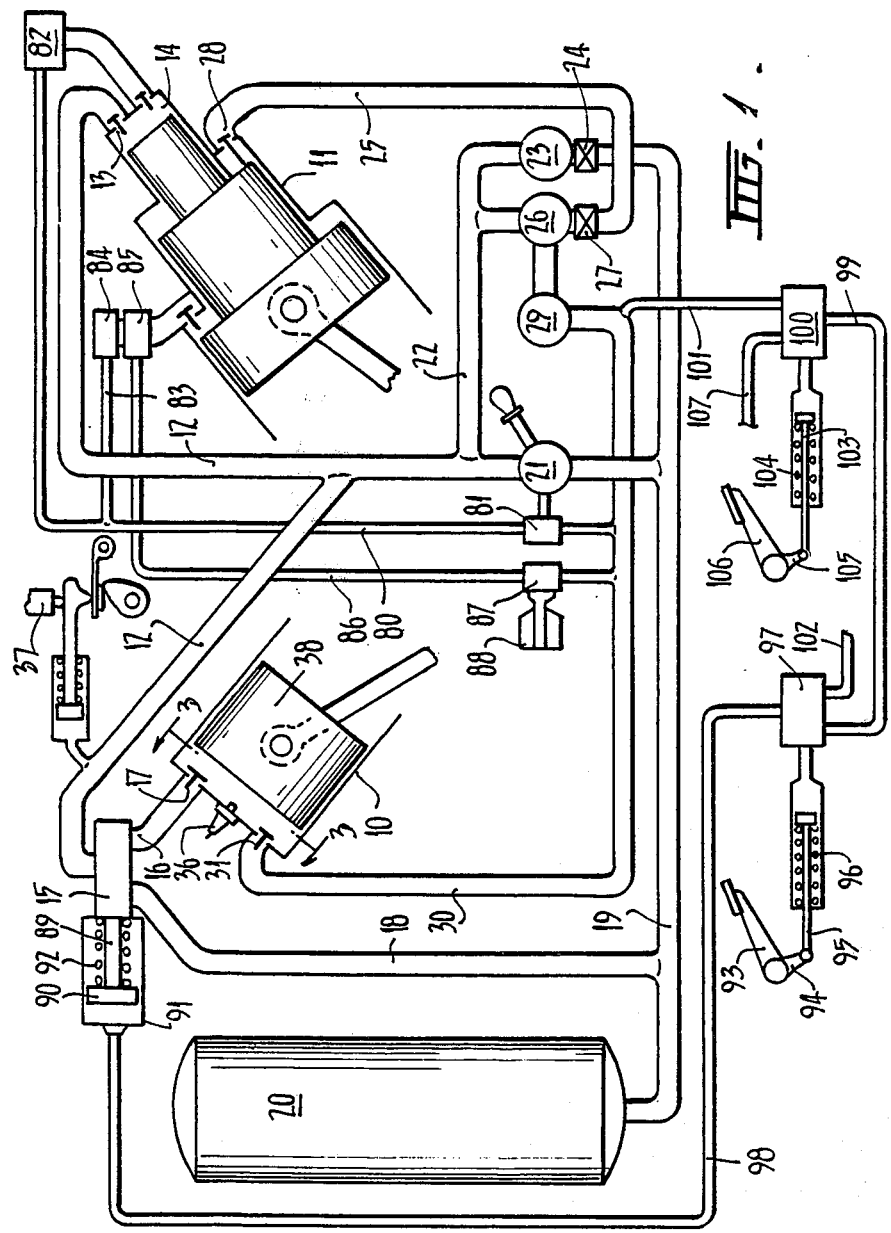
FIG. 1 is a schematic sectional view of the parts of the engine with which the invention is concerned.

Referring now to the drawings, the engine comprises a firing cylinder 10 and a three stage compressor 11, in this embodiment arranged in a Vee conformation and linked to a common crankshaft as described in U.S. Pat. No. 4,186,561. A combustion chamber is constituted by the space defined by the head of the firing cylinder 10 and the crown of the power piston 38 reciprocating therein, and recesses for the heads of valves 17 and 31 and for the electrodes of a spark plug 36. A branched pipe 12 provided with a non-return valve 13 leads from the high pressure stage 14 of the compressor to a two-way valve 15. One outlet from the valve 15 is connected by pipe 16 to the top of the firing cylinder 10 through a poppet valve 17. The outer outlet from the valve 15 opens into a pipe 18 opening into a pipe 19 leading from a compressed air storage receiver 20 into pipe 12 through a manually operated starter valve 21 and also into pipe 12 through a side branch 22 in which is located an air bleed valve 23 and a non-return valve 24. A pipe 25 leads from the intermediate stage of the compressor 11 to a pressure selector 26 through non-return valves 28 and 27.

The pressure selector 26 is also connected to the pipe 22 and to a reducing valve 29 from which a pipe 30 leads to the firing cylinder 10 through a poppet valve 31.

The pressure of the air admitted to the firing cylinder 10 through the poppet valve 31 is maintained within the range at which spark ignition can be reliably performed with a conventional spark plug, for example 1100 kPa. This is achieved by directing the air from the pressure selector 26 through the reducing valve 29 and the pipe 30 to the poppet valve 31. The air emerging from the pressure selector 26 is therefore at a pressure higher than the pressure required in the pipe 30. The pressure selector 26 is shown in FIG. 2 and comprises a cylinder 32 closed at both ends having a discharge port 33 permanently connected to the reducing valve 29 and a spring loaded piston 34 sliding in the cylinder 32, the piston 34, port 33 and pipes 22 and 25 being so located that the piston moves to place pipe 25 in communication with port 33 if the pressure of air from the second stage of the compressor is sufficient to compress the spring 35. If the pressure in the pipe 25 becomes insufficient to compress the spring, the piston 34 moves to the right to place pipe 22 in communication with port 33. In this way, the air supplied to the pipe 30 is drawn from pipe 12 and the high pressure stage 14 of the compressor 11 rather than the intended normal arrangement in which the pipe 30 is supplied with air from the intermediate stage of the compressor. The air from the port 33 passes through the reducing valve 29, where its pressure is reduced to a constant pressure of approximately 1100 kPa, to the pipe 30 and the poppet valve 31.

When the engine is running normally, a constant volume of relatively volatile pilot fuel, for example petrol, is injected by a fuel pump (not shown) into the air entering the firing cylinder 10 through the poppet valve 31, as the firing piston approaches top dead centre, and the mixture is ignited by a spark from a spark plug 36 before the piston reaches top dead centre.

As shown in FIG. 3, the electrodes of the spark plug 36 and the head of the poppet valve 31 are both located in a shallow recess in the head of the cylinder 10, and the head of the poppet valve 17 is located in a deeper recess also formed in the head of the cylinder 10. The pilot charge of air entering the cylinder through the valve 31 blows residual exhaust gases from the previous combustion away from the vicinity of the spark plug 36, thus ensuring effective ignition of the pilot air and fuel mixture by the spark.

While the pilot charge is burning, the poppet valve 31 closes and the main charge of air enters the cylinder 10 from pipe 12 through the valve 15, pipe 16 and poppet valve 17. Because this main charge is at a pressure higher than that in the cylinder, its velocity may blow out the pilot flame unless the blast is deflected. To attain this it enters through a deep recess, so is directed away from the burning gases in the vicinity of the spark plug. The main fuel is injected into the compressed air shortly before it enters the cylinder 10 through the valve 17. The mixture is ignited by the burning pilot charge, and burns with a sustained torch like flame to provide the main driving thrust in the cylinder 10. For maximum economy, the fuel pump injecting the main fuel may be arranged to reduce the rate of flow of main fuel over the concluding part of the injection.

Because of the effectiveness of ignition by the burning pilot charge, the main fuel may be a cheap liquid of low volatility not usually considered suitable for use in spark ignited engines. If such a fuel is used, separate fuel tanks are provided for the main and pilot fuels.

A fuel pump 37 having a delivery variable in response to the changing pressure of air delivered through poppet valve 17 caused by the accelerator setting, or the load on the engine, supplies the main fuel to air entering through poppet valve 17 from pipe 12. The fuel pump 37 may for example be of the construction shown in FIG. 18 of U.S. Pat. No. 4,186,561, but its timing will not require the accuracy attained by the special cam follower shown therein.

The performance of compression and firing in separate cylinders, which is a fundamental feature of split cycle engines, permits a change in the construction of the power pistons. Whereas in conventional internal combustion engines it is essential that heat passed to the top of the piston from the hot combustion gases be conducted through the piston rings to the cooled wall of the cylinder so that detonation of the fuel is prevented, in split cycle engines the head of the power piston is deliberately maintained hot. As shown in FIG. 4, the piston top 38 comprises a circular plate 39 of heat resistant material attached over insulating material 40 to the head of the piston 38. As the conduction of heat through the piston is not desired, the piston ring 38 can be made from plastic material. A conventional oil ring 41 is inserted in the skirt or other convenient position on the piston.

The compressor pistons often operate at such high speed that conventional air operated valves are inefficient when used as inlet and outlet valves. A preferred construction for these valves is shown in FIG. 5, in which the valves are mechanically operated with the assistance of the air passing respectively into or out of the cylinder. This FIG. 5 shows as an example the valves in the head of the high pressure stage 14 of the compressor. As the compressor remains cold, materials of construction different from those employed in conventional internal combustion engines can be used.

A circular inlet port 42 formed in the head of cylinder 14 has an O-ring inserted in a downwardly tapering dovetail groove around its periphery on the face of the head inside the cylinder. The inlet valve comprises a flat disc 43 covering the port 42 and seating against the O-ring. A short stem 44 extends from a tightly fitting ball joint on the disc 43 outwardly of the cylinder 14, and is formed as a part of the lever 45. The lever 45 is pivoted intermediate its length about a rocker shaft 46 of which the central axis is coplanar with the seating surface of the disc 43. At its outer end 47, the lever 45 is rotated in a direction to close the port 42 by a helical spring 48. The end 47 of the lever is moved in opposition to the spring 48 by a push rod 49 actuated by a pivoted lever 50 bearing on a rotating cam 51.

A circular outlet port 52 formed in the head of the cylinder 14 has an O-ring inserted in an upwardly tapering dovetailed groove around its periphery on the outside face of the cylinder head. The outlet valve comprises a flat disc 53 covering the port 52 and seating against the O-ring. A short stem 54 extends from a tightly fitting ball joint on the disc 53 outwardly of the cylinder 14, and is formed as a part of a lever 55. The lever 55 is pivoted intermediate its length about a rocker shaft 56 of which the axis is coplanar with the seating surface of the disc 53. At its outer end 57, the lever 55 is rotated in a direction to close the port by a helical spring 58. The end 57 of the lever is moved in opposition to the spring 58 by tension in a cable 59 looped over the end of a pivoted lever 60 bearing against a rotating cam 61.

Dovetail grooves are used to receive the O-rings because the air is at such high pressure that, if plain grooves were used, the air would penetrate beneath the O-rings and lift them out of the grooves.

The poppet valve 17 which admits high pressure air to the combustion chamber opens inwardly into the chamber, and a spring closing it must have sufficient tension to hold it closed against the air pressing underneath the valve head in the direction to open it. If a conventional push rod and tappet were used to operate the valve, the stress on the mechanism would be great when the air pressure was relatively low, such as when the engine is idling. An arrangement whereby the spring tension may be varied in conformity with the air pressure, and the stress on the operating mechanism thereby limited, will now be described with reference to FIG. 6.

The poppet valve 17 is held to its seat by a spring 62 in the normal manner. The bottom end of the spring 62 bears against a stop constituted by an internal flange 63 formed on the open end of a tube 64, which slides freely in a valve spring compartment 65 formed on the outside of the cylinder 10.

The other end of the tube 64 is closed by a piston 66 of diameter greater than the seating diameter of face 67 of the valve 17. Valve 17 is actuated by a push rod 68 engaging an external rocker arm 69 attached to the end of a rocker shaft 70 supported by sealed bearings within the compartment 65. An internal rocker arm 71 is attached to the rocker shaft 70 within the compartment 65 and extends for a sufficient distance to enable it to engage the end of the stem of the valve 17 to open the valve when the push rod 68 is raised.

As the pressure of the air entering behind the valve head 67 from the pipe 16 through a port 72 increases the pressure inside the valve spring compartment 65 increases by the same amount as the air passes to it through a passage 73. The piston 66 is thereby lifted, taking the attached tube 64 with it and compressing the spring 62. The tension which the spring 62 exerts on the valve to hold the head 67 against the seat accordingly increases by the same amount, so that the valve operating gear is subjected to the same normal working strain at all times.

The air bleed valve 23 is adjustable manually to permit a small amount of high pressure air from pipe 22 to pass to the air receiver 20 and build up its pressure while the engine is running. Non return valve 24 prevents the air from returning from the receiver 20.

The volume of fuel delivered by fuel pump 37 is controlled in response to the variations of pressure of the air in the pipe 12 by the action of the air on a spring loaded piston arrangement of known type.

At all times while the engine is running, a supply of compressed air of amount and pressure suitable to keep the engine idling is available, either from the second stage of the compressor, or, if the pressure in the second stage is too low, from the third stage of the compressor. Should the first stage of the compressor be completely unloaded, the second stage will inhale enough atmospheric air to maintain the engine idling after passing through the third stage.

The procedure when starting up the engine is as follows: The crankshaft of the engine is first turned by known means to a position at which the poppet valve 17, which admits high pressure air to the firing cylinder 10, is open. The starter valve 21 is moved manually to the "Start" position to allow compressed air from the receiver 20 to pass through pipes 19 and 12 into the cylinder 10. The piston 38 is thereby forced down the cylinder 10 to rotate the crankshaft.

A pipe 80 connects the pipe 30 through a valve 81, which operates in unison with the starter valve 21, to a valve 82. A branch pipe 83 connects the pipe 80 to a valve 84. The valves 82 and 84 are normally closed. However, when actuated by compressed air from pipe 80, valve 82 opens thereby venting to atmosphere the high pressure stage 14 of the compressor 11, and valve 84 opens thereby venting to atmosphere the low pressure stage of the compressor 11. In this way, the compressor is unloaded. A valve 85 opening to atmosphere from the low pressure stage of the compressor 11 is opened by compressed air directed to it through a pipe 86 which is connected to the pipe 30 through a valve 87 operated automatically by a speed governor 88. In a vehicle, it could also be operated by manual movement of the driver's accelerator. If the engine speed becomes excessive, the governor 88, or the accelerator, actuates the valve 87 to open the valve 85 and thereby reduce the pressure of the air supplied by the compressor 11 to the cylinder 10.

In service which requires frequent acceleration and deceleration, for example in a road vehicle, the engine according to this invention conserves energy by storing compressed air during deceleration instead of dissipating the energy as heat in a conventional braking system. This stored air can then be used in an ensuing period of acceleration. In order to store the compressed air, the valve 15 is operated to direct the compressed air from the pipe 12 into pipe 18 and the air receiver 20, instead of into the firing cylinder 10 as in normal operation.

The valve 15 is operated by a piston rod 89 attached to a piston 90 moving in a cylinder 91. A helical spring 92 urges the piston 90 to the left as shown in FIG. 1, to maintain the pipes 12 and 16 in communication. When a brake pedal 93 is depressed, a lever 94 fixed to the pedal draws a rod 95 to the left against a helical spring 96 to operate a valve 97 to place a pipe 98 in communication through a pipe 99, a valve 100, and a pipe 101 with the pipe 30. The valve 100 is normally in the open position, so that compressed air flows through pipes 99 and 98 into the cylinder 91 to force the piston 90 to the right, thereby cutting off the supply of compressed air to the pipe 16 and directing it into the receiver 20. The engine accordingly ceases to perform work, and the inertia of the engine and vehicle is absorbed by the compressor 11 delivering air into the receiver 20 against the pressure of the air already there.

When pressure is removed from the brake pedal 93, the spring 96 returns the rod 95 to the right, closing the pipe 99 and venting the pipe 98 to atmosphere through the outlet 102. The spring 92 then moves the piston 90 to the left, so that valve 15 is operated to direct compressed air from pipe 12 to pipe 16, whereby the engine again supplies power to propel the vehicle.

The valve 100 is operated by a rod 103 which moves to the left against a helical spring 104 when drawn by a lever 105 fixed to a clutch pedal 106. The rod 103 is normally at the righ hand limit of travel, and the spring 104 is unloaded, whereby the pipe 101 communicates with pipe 99. When the clutch pedal 106 is depressed, for example when the vehicle is stopping, the valve 100 is moved so that pipe 101 is sealed, and pipe 99 is vented to atmosphere through an outlet 107. Thus, irrespective of the position of valve 97, air pressure will be released from pipe 98 so that piston 90 will move to the left to operate valve 15 to direct compressed air from the pipe 12 through the pipe 16 to the cylinder 10 and maintain the engine running.

Acceleration of the engine can be boosted by manually moving the valve 21 to the "Start" position, so that compressed air flows from the receiver 20 through the pipes 19, 12 and 16 to the cylinder 10 while the compressor 11 is unloaded. In this way, approximately 20% more power is delivered by the engine without increasing fuel consumption for as long as the pressure of the air in the receiver 20 remains high enough. It is accordingly desirable to provide a pressure gauge on the receiver 20 for the guidance of the operator so that he will know when this method of increasing acceleration is available.

It is preferred, for maximum efficiency, to provide an expansion cylinder connected to the firing cylinder 10 with its associated piston driving the crankshaft in the manner disclosed in U.S. Pat. No. 4,186,561.

An engine may have a plurality of firing cylinders of the above described construction connected to a common crankshaft.

I claim:

1. A spark ignition internal combustion engine comprising a firing cylinder and a compression cylinder having reciprocating therein respectively a power piston and a compression piston connected to a common crankshaft, a combustion chamber defined by the firing cylinder head, at least one recess containing valve heads and spark plug electrodes, and the crown of the moving power piston characterised by means directing into the combustion chamber in advance of the spark as the power piston approaches or reaches top dead centre a pilot charge composed of spark-ignitable fuel mixed with compressed air from the compression cylinder at a pressure below 2000 kPa, means producing a spark across the electrodes at or near top dead centre, and means directing into the combustion chamber after the spark and while the piston is moving away from the cylinder head on the first part of the power stroke a second charge composed of fuel and compressed air from the compression cylinder at a pressure greater than 2000 kPa.

2. An engine according to claim 1, characterised in that deceleration is assisted by means diverting the compressed air supplied by the compression cylinder away from the firing cylinder, thereby reducing the pressure in the combustion chamber.

3. An engine according to claim 2, characterised in that the diverted compressed air is directed into a compressed air receiver.

4. An engine according to claim 1, characterised in that the means directing compressed air into the combustion chamber comprises at least one poppet valve closed by a helical compression spring bearing against a movable stop urged in the direction to close the valve by the pressure of the compressed air.

* * * * *